United States Patent
Katano et al.

(10) Patent No.: US 8,153,322 B2
(45) Date of Patent: Apr. 10, 2012

(54) FUEL CELL SYSTEM HAVING AN INJECTOR

(75) Inventors: Koji Katano, Toyota (JP); Norio Yamagishi, Aichi (JP); Akihisa Hotta, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 375 days.

(21) Appl. No.: 12/445,804

(22) PCT Filed: Nov. 8, 2007

(86) PCT No.: PCT/JP2007/072148
§ 371 (c)(1),
(2), (4) Date: Apr. 16, 2009

(87) PCT Pub. No.: WO2008/062702
PCT Pub. Date: May 29, 2008

(65) Prior Publication Data
US 2010/0040922 A1    Feb. 18, 2010

(30) Foreign Application Priority Data

Nov. 22, 2006    (JP) .................................. 2006-315933

(51) Int. Cl.
*H01M 8/04* (2006.01)
(52) U.S. Cl. ........................................ 429/444; 429/414
(58) Field of Classification Search ........................ None
See application file for complete search history.

(56) References Cited

U.S. PATENT DOCUMENTS

| | | | | |
|---|---|---|---|---|
| 4,796,661 | A * | 1/1989 | Hishinuma et al. | 137/487.5 |
| 6,988,489 | B2 * | 1/2006 | Tanaka et al. | 123/479 |
| 7,087,335 | B2 * | 8/2006 | Kolodziej et al. | 429/444 |
| 2002/0048698 | A1 * | 4/2002 | Fronk | 429/19 |
| 2003/0012985 | A1 * | 1/2003 | McAlister | 429/12 |

FOREIGN PATENT DOCUMENTS

| | | |
|---|---|---|
| JP | 2000-283006 A | 10/2000 |
| JP | 2000-345916 A | 12/2000 |
| JP | 2002-134139 A | 5/2002 |
| JP | 2003-201921 A | 7/2003 |
| JP | 2004-360632 A | 12/2004 |
| JP | 2005-093213 A | 4/2005 |
| JP | 2005-302563 A | 10/2005 |
| JP | 2005-302571 A | 10/2005 |
| JP | 2007-207743 A | 8/2007 |
| JP | 2007-280654 A | 10/2007 |

* cited by examiner

*Primary Examiner* — Michael Zarroli
(74) *Attorney, Agent, or Firm* — Kenyon & Kenyon LLP

(57) ABSTRACT

A fuel cell system having a fuel cell, a reactant gas pipe for supplying a reactant gas to the fuel cell, and an injector for driving a valve body at a predetermined drive cycle by an electromagnetic driving force to separate the valve body from a valve seat, regulating conditions of the gas on the upstream side in the reactant gas pipe and supplying the gas to the downstream side. A gas element component responding to the physical quantity of the reactant gas circulating through the reactant gas pipe is integrally provided in the injector so as to come close to the injector.

12 Claims, 8 Drawing Sheets

FUEL CELL SYSTEM HAVING AN INJECTOR

This is a 371 national phase application of PCT/JP2007/072148 filed 8 Nov. 2007, which claims priority to Japanese Patent Application No. 2006-315933 filed 22 Nov. 2006, the contents of which are incorporated herein by reference.

FIELD OF THE INVENTION

The present invention relates to a fuel cell system including an injector in a reactant gas pipe connected to a fuel cell.

Background of the Invention

At present, a fuel cell system including a fuel cell for receiving a supplied reactant gas (a fuel gas and an oxidizing gas) to generate a power has been suggested and put to practical use. In such a fuel cell system, a reactant gas pipe for allowing the fuel gas supplied from a fuel supply source such as a hydrogen tank to flow to the fuel cell is provided with a flow rate regulation valve which regulates gas conditions, and an open valve is provided on the downstream side of this flow rate regulation valve (e.g., see Japanese Patent Application Laid-Open No. 2002-134139).

SUMMARY OF THE INVENTION

However, in a fuel cell system disclosed in Patent Document 1 described above, a flow rate regulation valve is arranged away from an open valve, and delay might occur in opening the open valve with respect to the fluctuations of a gas pressure regulated by the flow rate regulation valve on the upstream side. Such response delay is a problem which might occur in not only the open valve but also various components, as long as the components are gas element components responding to the physical quantity of a reactant gas.

The present invention has been developed in view of such a situation, and an object thereof is to provide a fuel cell system capable of improving the response of a gas element component responding to the physical quantity of a reactant gas.

To achieve the above object, the fuel cell system according to the present invention is a fuel cell system comprising a fuel cell; a reactant gas pipe which supplies a reactant gas to the fuel cell; and an injector which drives a valve body at a predetermined drive cycle by an electromagnetic driving force to separate the valve body from a valve seat and which regulates conditions of the gas on the upstream side in the reactant gas pipe to supply the gas to the downstream side, a gas element component responding to the physical quantity of the reactant gas circulating through the reactant gas pipe being integrally provided in the injector.

According to such a constitution, the gas element component is integrally provided in the injector to come close to the injector, and hence the response delay of the gas element component with respect to pressure fluctuations caused by the intermediate can be suppressed.

In the above fuel cell system, the gas element component may be an open valve which opens at a predetermined pressure.

In the above fuel cell system, the open valve may connect the downstream side of the injector to the outside of the reactant gas pipe, when opening.

In the above fuel cell system, the open valve may connect the upstream side of the injector to the downstream side thereof, when opening.

In the above fuel cell system, in a case where the open valve is provided in a support block which supports the downstream side of the injector, open ports of the open valve to the outside of the reactant gas pipe may be directed downwards.

According to such a constitution, even when droplets attach to the open valve, the droplets are discharged from the downside, and can be prevented from attaching to the valve body.

In the above fuel cell system, a diffusion plate may be provided at a portion to which the gas is jetted from the open ports.

In the above fuel cell system, in a case where the open valve is provided in the support block which supports the downstream side of the injector, a main passage portion and a branch passage portion branching from the main passage portion to the open valve are provided in the support block, and the main passage portion may extend below the branch position of the branch passage portion.

In the above fuel cell system, in a case where the open valve is provided in the support block which supports the downstream side of the injector, the main passage portion and the branch passage portion branching from the main passage portion to the open valve are provided in the support block, and the passage sectional area of the branch passage portion is larger than that of the main passage portion.

According to such a constitution, even in a case where there occurs such an error that the injector does not return from a fully opened state to a fully closed state (so-called adhering to the opened state), more reactant gas can be discharged from the open valve to the outside of the reactant gas pipe through the branch passage portion having a large passage sectional area, and eventually a pressure applied to the fuel cell can be decreased.

In the above fuel cell system, in a case where the open valve is provided in the support block which supports the downstream side of the injector, the main passage portion and the branch passage portion branching from the main passage portion to the open valve are provided in the support block, and the branch passage portion may extend along a direction crossing the main passage portion at right angles.

In the above fuel cell system, the open valve may be supported by a support block which supports the upstream side of the injector and the support block which supports the downstream side of the injector.

In the above fuel cell system, the open valve may connect the support block which supports the upstream side of the injector to the support block which supports the downstream side of the injector.

In the above fuel cell system, the open valve may be arranged on the inner side of a sound absorbing cover which covers the injector.

In the above fuel cell system, the gas element component may be a pressure sensor for use in the opening/closing control of the injector.

According to such a constitution, since the pressure sensor is arranged close to the injector, the time delay of injector control based on the pressure detected by the pressure sensor can be decreased, and the response of the injector to the opening/closing control can be improved.

According to the present invention, there can be provided a fuel cell system capable of improving the response of the gas element component responding to the physical quantity of the reactant gas regulated by the injector on the upstream side.

BEST MODE FOR CARRYING OUT THE INVENTION

Hereinafter, a fuel cell system 1 according to a first embodiment of the present invention will be described with reference to FIGS. 1 to 8.

Figure 1:
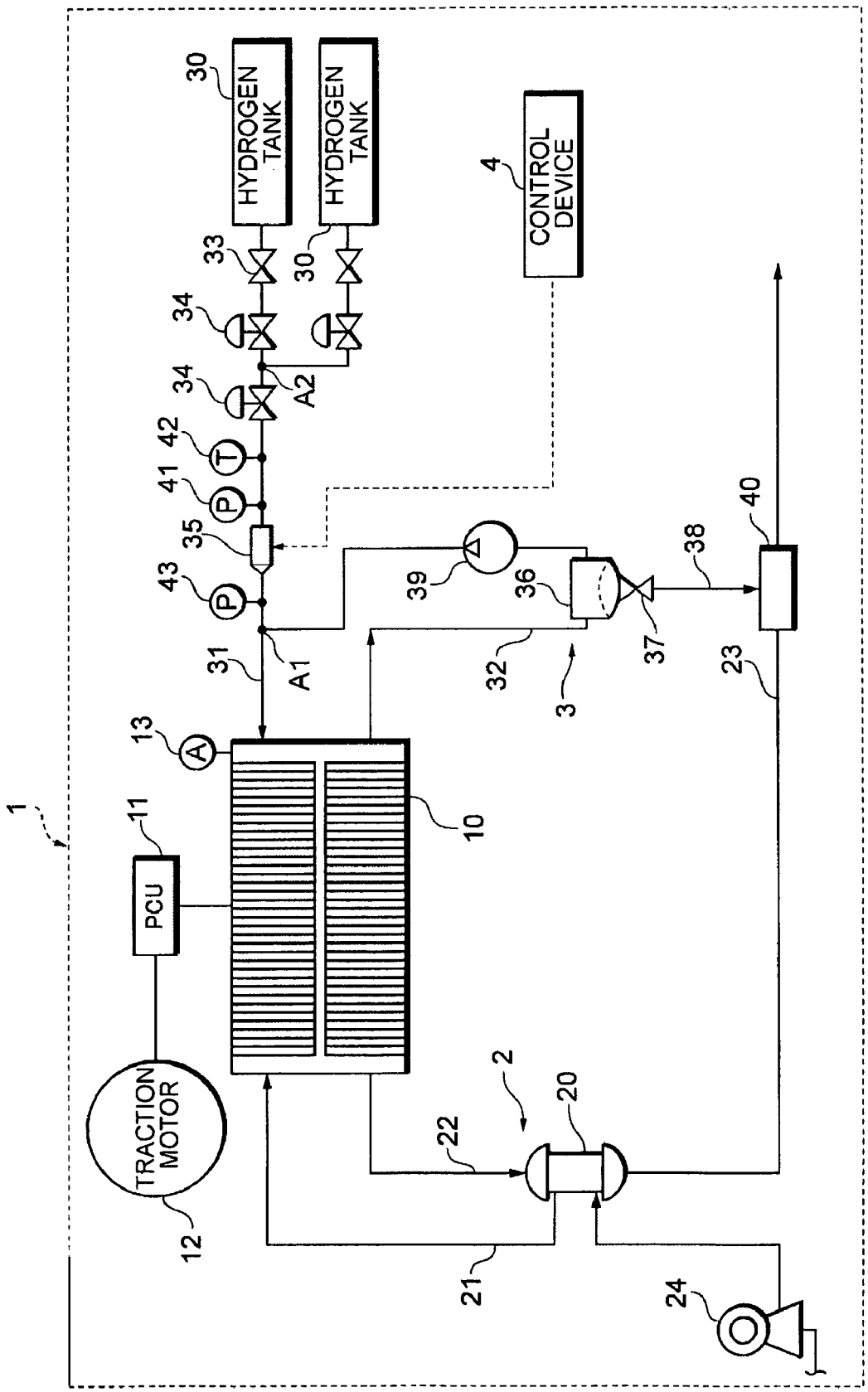
FIG. 1 is a constitution diagram of a fuel cell system according to a first embodiment of the present invention.

FIG. 1 is a system constitution diagram of the fuel cell system 1. This fuel cell system 1 can be applied to a car-mounted power generation system for a fuel cell car, a power generation system for any mobile body such as a ship, an airplane, a train or a walking robot, a further stational power generation system for use as a power generation facility for a construction (a housing, a building or the like) or the like, and the system is specifically used for the car.

As shown FIG. 1, the fuel cell system 1 according to the first embodiment includes a fuel cell 10 which receives a supplied reactant gas (an oxidizing gas and a fuel gas) to generate a power, and also includes an oxidizing gas piping system 2 which supplies air as the oxidizing gas to the fuel cell 10, a hydrogen gas piping system 3 which supplies a hydrogen gas as the fuel gas, a control device 4 which generally controls the whole system and the like.

The fuel cell 10 has a stack structure in which the required number of unitary cells for receiving the supplied reactant gas to generate the power are stacked. The power generated by the fuel cell 10 is supplied to a power control unit (PCU) 11. The PCU 11 includes an inverter, a DC-DC converter and the like arranged between the fuel cell 10 and a traction motor 12. A current sensor 13 which detects a current during the power generation is attached to the fuel cell 10.

The oxidizing gas piping system 2 includes an air supply passage 21 which supplies the oxidizing gas (air) humidified by a humidifier 20 to the fuel cell 10, an air discharge passage 22 which guides an oxidizing off gas discharged from the fuel cell 10 to the humidifier 20 and an exhaust passage 23 for guiding the oxidizing off gas from the humidifier 20 to the outside. The air supply passage 21 is provided with a compressor 24 which takes the oxidizing gas from the atmosphere to feed the gas under pressure to the humidifier 20.

The hydrogen gas piping system 3 includes a hydrogen tank 30 as a fuel supply source in which the hydrogen gas having a high pressure (e.g., 70 MPa) is received, a hydrogen supply passage (a reactant gas pipe) 31 as a fuel supply passage for supplying the hydrogen gas of the hydrogen tank 30 to the fuel cell 10, and a circulation passage 32 for returning a hydrogen off gas discharged from the fuel cell 10 to the hydrogen supply passage 31. It is to be noted that instead of the hydrogen tank 30, a reformer which forms a reformed hydrogen-rich gas from a hydrocarbon based fuel, and a high-pressure gas tank which brings the reformed gas formed by this reformer into a high pressure state to accumulate the pressure may be adopted as the fuel supply source. Moreover, a tank having a hydrogen occluded alloy may be adopted as the fuel supply source.

The hydrogen supply passage 31 is provided with a block valve 33 which blocks or allows the supply of the hydrogen gas from the hydrogen tank 30, regulators 34 which regulate the pressure of the hydrogen gas, and an injector 35. Moreover, on the upstream side of the injector 35 are provided a primary pressure sensor 41 and a temperature sensor 42 for detecting the pressure and the temperature of the hydrogen gas in the hydrogen supply passage 31, respectively. Moreover, on the downstream side of the injector 35 and the upstream side of a joining part between the hydrogen supply passage 31 and the circulation passage 32, a secondary pressure sensor 43 which detects the pressure of the hydrogen gas in the hydrogen supply passage 31 is provided.

Each regulator 34 is a device which regulates an upstream pressure (the primary pressure) to a preset secondary pressure. In the fuel cell system 1 according to the first embodiment, a mechanical pressure reduction valve for reducing the primary pressure is adopted as the regulator 34. As a constitution of the mechanical pressure reduction valve, a known constitution having a housing provided with a back pressure chamber and a pressure regulation chamber disposed via a diaphragm can be adopted, and in the pressure regulation chamber, the primary pressure is reduced to a predetermined pressure to obtain the secondary pressure by a back pressure in the back pressure chamber.

Figure 2:
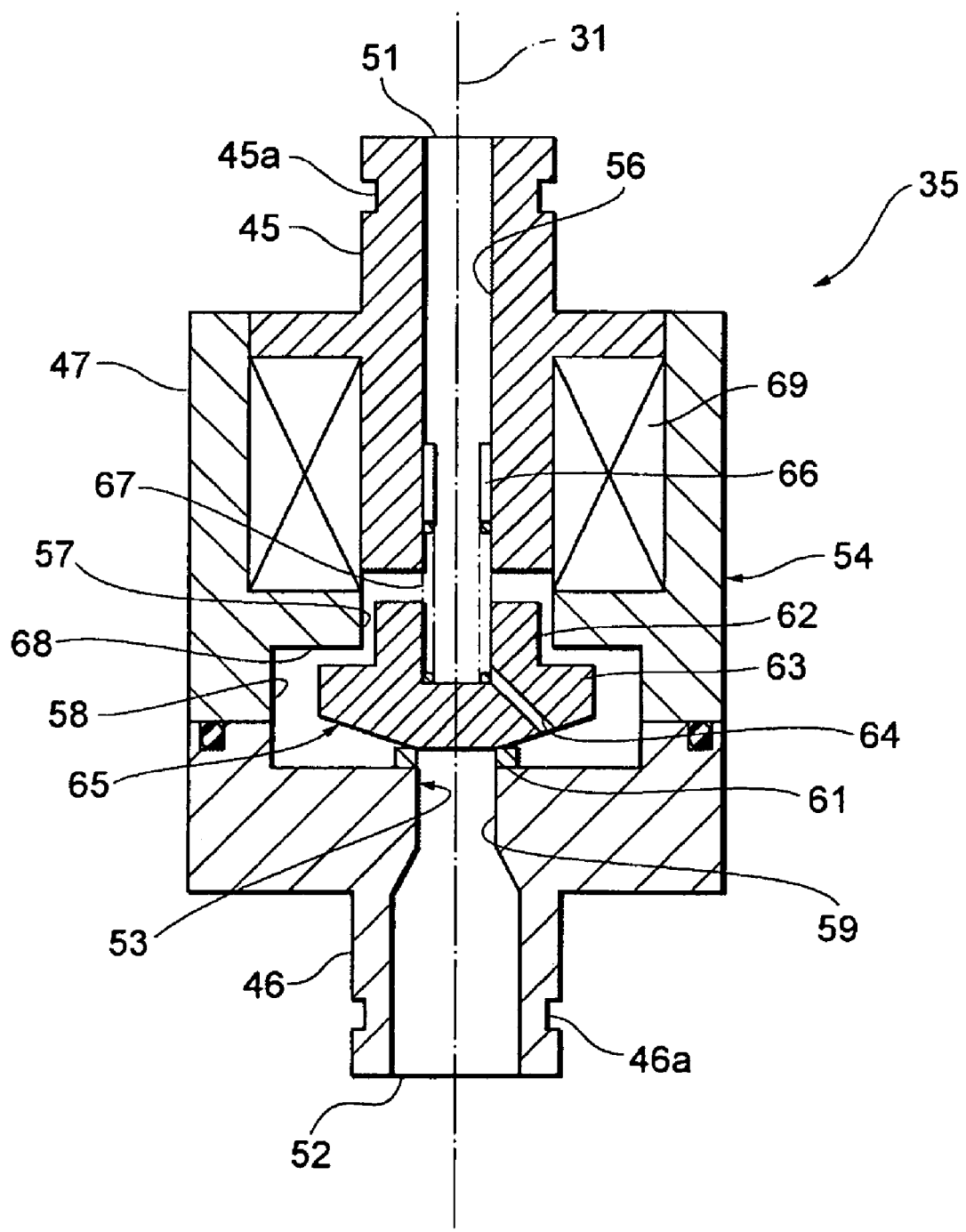
FIG. 2 is a sectional view showing an injector of the fuel cell system shown in FIG. 1.

FIG. 2 is a sectional view showing the injector 35. This injector 35 regulates gas conditions in the hydrogen supply passage 31, constitutes a part of the hydrogen supply passage 31, and has a metal cylinder 54 provided with an internal passage 53 which is arranged on the side of the hydrogen tank 30 in the hydrogen supply passage 31 in a port portion 51 formed inside a cylindrical portion 45 at one end of the cylinder in an axial direction, the internal passage being arranged on the side of the fuel cell 10 in the hydrogen supply passage 31 in a port portion 52 formed inside a cylindrical portion 46 on the other end of the cylinder in the axial direction, the cylindrical portion having the same axis as that of the one cylindrical portion 45.

This cylinder 54 is provided with a first passage portion 56 connected to the port portion 51; a second passage portion 57 connected to this first passage portion 56 on a side opposite to the port portion 51 and having a diameter larger than that of the first passage portion 56; a third passage portion 58 connected to this second passage portion 57 on a side opposite to the first passage portion 56 and having a diameter larger than that of the second passage portion 57; and a fourth passage portion 59 connected to this third passage portion 58 on a side opposite to the second passage portion 57 and having a diameter smaller than that of each of the second passage portion 57 and the third passage portion 58, and these portions constitute the internal passage 53. It is to be noted that the outer peripheral portion of the cylindrical portion 45 is provided with an annular seal groove 45a, and the outer peripheral portion of the cylindrical portion 46 is also provided with an annular seal groove 46a.

Moreover, the injector 35 has a valve seat 61 provided in a main body portion 47 arranged between both the cylindrical portions 45 and 46 and having a diameter larger than that of each cylindrical portion so as to surround an opening of the fourth passage portion 59 on the third passage portion 58 side, the valve seat being constituted of a sealing member of, for example, rubber; a metal valve body 65 having a cylindrical portion 62 movably inserted into the second passage portion 57 and a bevel portion 63 arranged in the third passage portion 58 and having a diameter larger than that of the second passage portion 57, the bevel portion 63 being provided with an oblique communication hole 64; a spring 67 whose one end is inserted into the cylindrical portion 62 of the valve body 65 and whose other end is engaged with a stopper 66 formed in the first passage portion 56, to allow the valve body 65 to abut on the valve seat 61, thereby blocking the internal passage 53; and a solenoid 69 which moves the valve body 65 against the urging force of the spring 67 by an electromagnetic driving force until the valve body abuts on a stepped portion 68 of the third passage portion 58 on the side of the second passage portion 57, to detach the valve body 65 from the valve seat 61 and connect the communication hole 64 to the internal passage 53. Here, the valve body 65 operates along the axial direction of the cylinder 54.

The valve body 65 of the injector 35 is driven by energization control of the solenoid 69 as an electromagnetic driving device, and a pulse-like excitation current supplied to this solenoid 69 can be turned on/off to change the opening state of the internal passage 53 (in two stages, that is, a fully opened stage and a fully closed stage in the present embodiment). Moreover, the gas jet time and the gas jet timing of the injector 35 are controlled by a control signal output from the control device 4, so that the flow rate and the pressure of the hydrogen gas are precisely controlled.

To supply the gas to the downstream side of the injector 35 with a demanded flow rate, at least one of the opening state (the open degree) and the opening time by the valve body 65 provided in the internal passage 53 of the injector 35 is changed, to regulate the flow rate of the gas (or a hydrogen molar concentration) supplied to the downstream side (the fuel cell 10 side).

It is to be noted that the gas flow rate is regulated by the opening/closing of the valve body 65 of the injector 35, and additionally the pressure of the gas supplied to the downstream side of the injector 35 is reduced as compared with the gas pressure on the upstream side of the injector 35, and hence the injector 35 can be considered as a pressure regulation valve (a pressure reduction valve, a regulator). Moreover, in the present embodiment, the injector can be considered as a variable pressure regulation valve capable of changing the pressure regulation amount (the pressure reduction amount) of the upstream gas pressure of the injector 35 so that the pressure agrees with the demanded pressure in a predetermined pressure range in accordance with gas demand.

It is to be noted that in the first embodiment, as shown in FIG. 1, the injector 35 is arranged on the upstream side from a joining part A1 between the hydrogen supply passage 31 and the circulation passage 32. Here, a plurality of hydrogen tanks 30 are adopted as fuel supply sources, and hence the injector 35 is arranged on the downstream side from a part (a hydrogen gas joining part A2) where the hydrogen gases supplied from the hydrogen tanks 30 join one another.

The circulation passage 32 is connected to a discharge passage 38 via a gas-liquid separator 36 and a gas/water discharge valve 37. The gas-liquid separator 36 collects a water content from the hydrogen off gas. The gas/water discharge valve 37 operates in accordance with a command from the control device 4 to discharge (purge) to the outside the water content collected by the gas-liquid separator 36 and the hydrogen off gas including impurities in the circulation passage 32.

Moreover, the circulation passage 32 is provided with a hydrogen pump 39 which pressurizes the hydrogen off gas in the circulation passage 32 to feed the gas to the hydrogen supply passage 31. It is to be noted that the hydrogen off gas discharged through the gas/water discharge valve 37 and the discharge passage 38 is diluted by a dilution unit 40 to join the oxidizing off gas in the exhaust passage 23.

The control device 4 detects the operation amount of an accelerating operation device (an accelerator or the like) provided in the vehicle, and receives control information such as a demanded acceleration value (a demanded power generation amount from a load device such as the traction motor 12) to control the operations of various devices in the system.

It is to be noted that the load device generically refers to power consumption devices including, in addition to the traction motor 12, auxiliary devices necessary for operating the fuel cell 10 (e.g., motors of the compressor 24, the hydrogen pump 39, a cooling pump and the like), actuators used in various devices (a change gear, a wheel control device, a steering device, a suspension device, etc.) associated with the running of the vehicle, an air conditioning device (an air conditioner), lighting and audio for a passenger space and the like.

The control device 4 is constituted of a computer system (not shown). Such a computer system includes a CPU, an ROM, an RAM, an HDD, an input/output interface, a display and the like, and the CPU reads and executes various control programs recorded in the ROM to realize various control operations.

Figure 3:
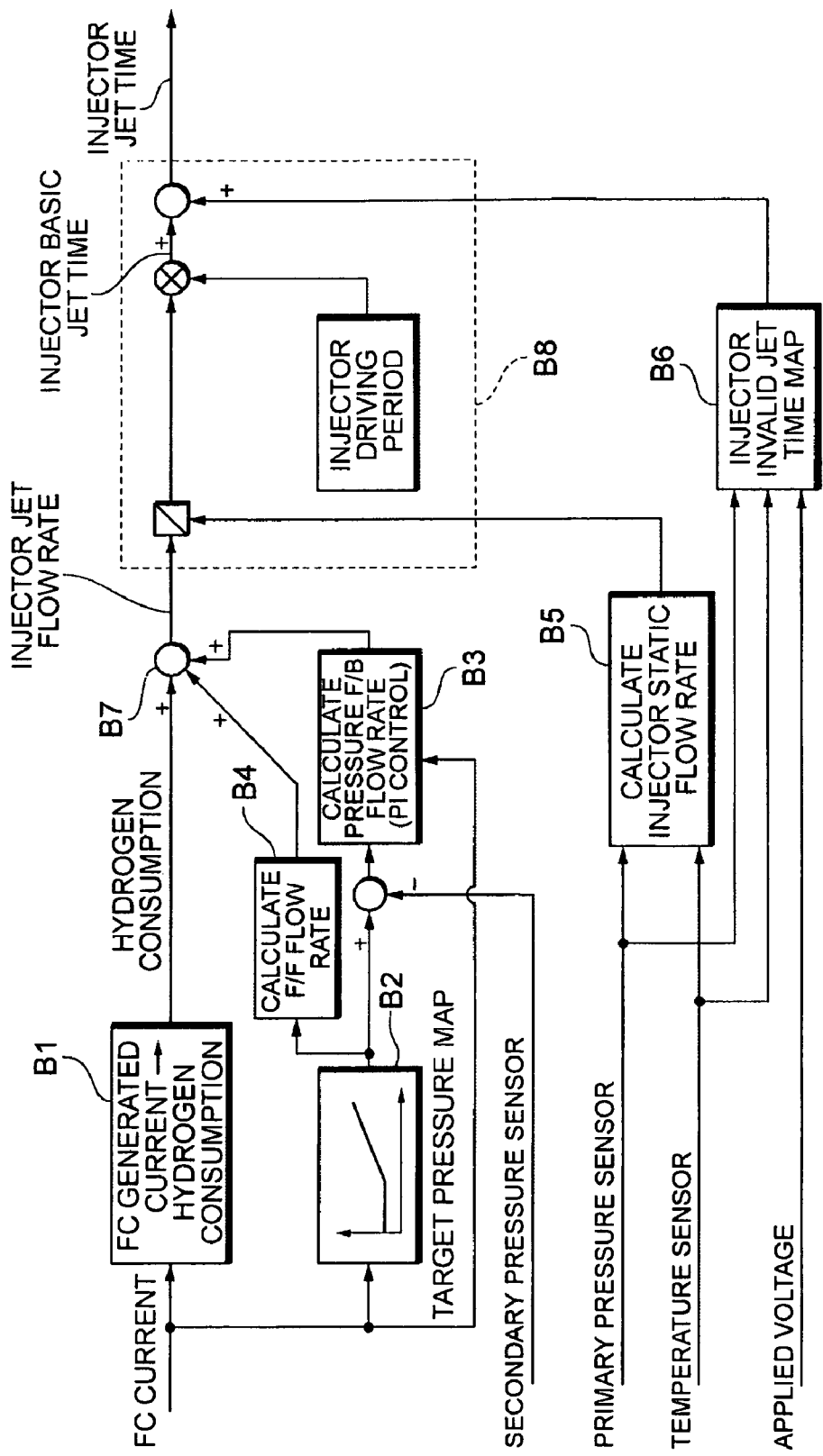
FIG. 3 is a control block diagram for explaining a control configuration of a control device of the fuel cell system shown in FIG. 1.

Specifically, as shown in FIG. 3, the control device 4 calculates the amount (hereinafter referred to as the "hydrogen consumption") of the hydrogen gas consumed by the fuel cell 10 based on the operation state of the fuel cell 10 (a current value during the power generation of the fuel cell 10 detected by the current sensor 13) (a fuel consumption calculating function: B1). In the present embodiment, the hydrogen consumption is calculated and updated for each calculation period of the control device 4 by use of a specific calculation formula indicating a relation between the current value of the fuel cell 10 and the hydrogen consumption.

Moreover, the control device 4 calculates a target pressure value (a target gas supply pressure with respect to the fuel cell 10) of the hydrogen gas in a downstream position of the injector 35 based on the operation state of the fuel cell 10 (the current value of the fuel cell 10 during the power generation detected by the current sensor 13) (a target pressure value calculating function: B2). In the present embodiment, the target pressure value in a position where the secondary pressure sensor 43 is arranged (a pressure regulation position as a position where pressure regulation is demanded) is calculated and updated for each calculation period of the control device 4 by use of a specific map indicating a relation between the current value of the fuel cell 10 and the target pressure value.

Furthermore, the control device 4 calculates a feedback correction flow rate based on a deviation between the calculated target pressure value and a detected pressure value in the downstream position (the pressure regulation position) of the injector 35 detected by the secondary pressure sensor 43 (a feedback correction flow rate calculating function: B3). The feedback correction flow rate is a hydrogen gas flow rate (a pressure difference reducing correction flow rate) to be added to the hydrogen consumption in order to reduce the deviation between the target pressure value and the detected pressure value. In the present embodiment, the feedback correction flow rate is calculated and updated for each calculation period of the control device 4 by use of a target follow-up type control rule of PI control or the like.

In addition, the control device 4 calculates a feed forward correction flow rate corresponding to a deviation between the previously calculated target pressure value and the presently calculated target pressure value (a feed forward correction flow rate calculating function: B4). The feed forward correction flow rate is a fluctuation (a pressure difference corresponding correction flow rate) of the hydrogen gas flow rate due to the fluctuation of the target pressure value.

In the present embodiment, there are provided a plurality of (e.g., two maps for a high pressure and a low pressure based on a predetermined threshold value) maps indicating a relation between the deviation of the target pressure value and the feed forward correction flow rate in accordance with the primary pressure, and the feed forward correction flow rate is calculated and updated for each calculation period of the control device 4 by use of these maps. It is to be rioted that the plurality of maps are changed in accordance with the pressure value of the primary pressure sensor 41.

Moreover, the control device 4 calculates the upstream static flow rate of the injector 35 based on the upstream gas state of the injector 35 (a hydrogen gas pressure detected by the primary pressure sensor 41 and a hydrogen gas temperature detected by the temperature sensor 42) (a static flow rate calculating function: B5). In the present embodiment, a static flow rate is calculated and updated for each calculation period of the control device 4 by use of a specific calculation formula indicating a relation between the upstream hydrogen gas pressure and temperature of the injector 35 and the static flow rate.

Furthermore, the control device 4 calculates the invalid jet time of the injector 35 based on the upstream gas state (the pressure and the temperature of the hydrogen gas) of the injector 35 and the applied voltage (an invalid jet time calculating function: B6). Here, the invalid jet time is a time required from a time when the injector 35 receives a control signal from the control device 4 to a time when jetting is actually started. In the present embodiment, the invalid jet time is calculated and updated for each calculation period of the control device 4 by use of a specific map indicating a relation among the pressure and temperature of the hydrogen gas on the upstream side of the injector 35, the applied voltage and the invalid jet time.

In addition, the control device 4 adds up the hydrogen consumption, the feedback correction flow rate and the feed forward correction flow rate to calculate the jet flow rate of the injector 35 (a jet flow rate calculating function: B7). Then, the control device 4 multiplies, by the driving period of the injector 35, a value obtained by dividing the jet flow rate of the injector 35 by the static flow rate to calculate the basic jet time of the injector 35, and adds up this basic jet time and the invalid jet time to calculate the total jet time of the injector 35 (a total jet time calculating function: B8). Here, the driving period is a stepped (on/off) waveform-like period indicating the opening/closing state of the jet hole of the injector 35. In the present embodiment, the control device 4 sets the driving period to a constant value.

Then, the control device 4 outputs a control signal for realizing the total jet time of the injector 35 calculated through the above-mentioned procedure, whereby the gas jet time and the gas jet timing of the injector 35 are controlled to regulate the flow rate and the pressure of the hydrogen gas to be supplied to the fuel cell 10.

During the usual operation of the fuel cell system 1, the hydrogen gas is supplied from the hydrogen tank 30 to a fuel pole of the fuel cell 10 through the hydrogen supply passage 31, and the humidified and regulated air is supplied to an oxidation pole of the fuel cell 10 through the air supply passage 21, to generate a power. In this case, a power (a demanded power) to be extracted from the fuel cell 10 is calculated by the control device 4, and the hydrogen gas and air are supplied into the fuel cell 10 as much as amounts corresponding to the amount of the generated power.

Figure 4:
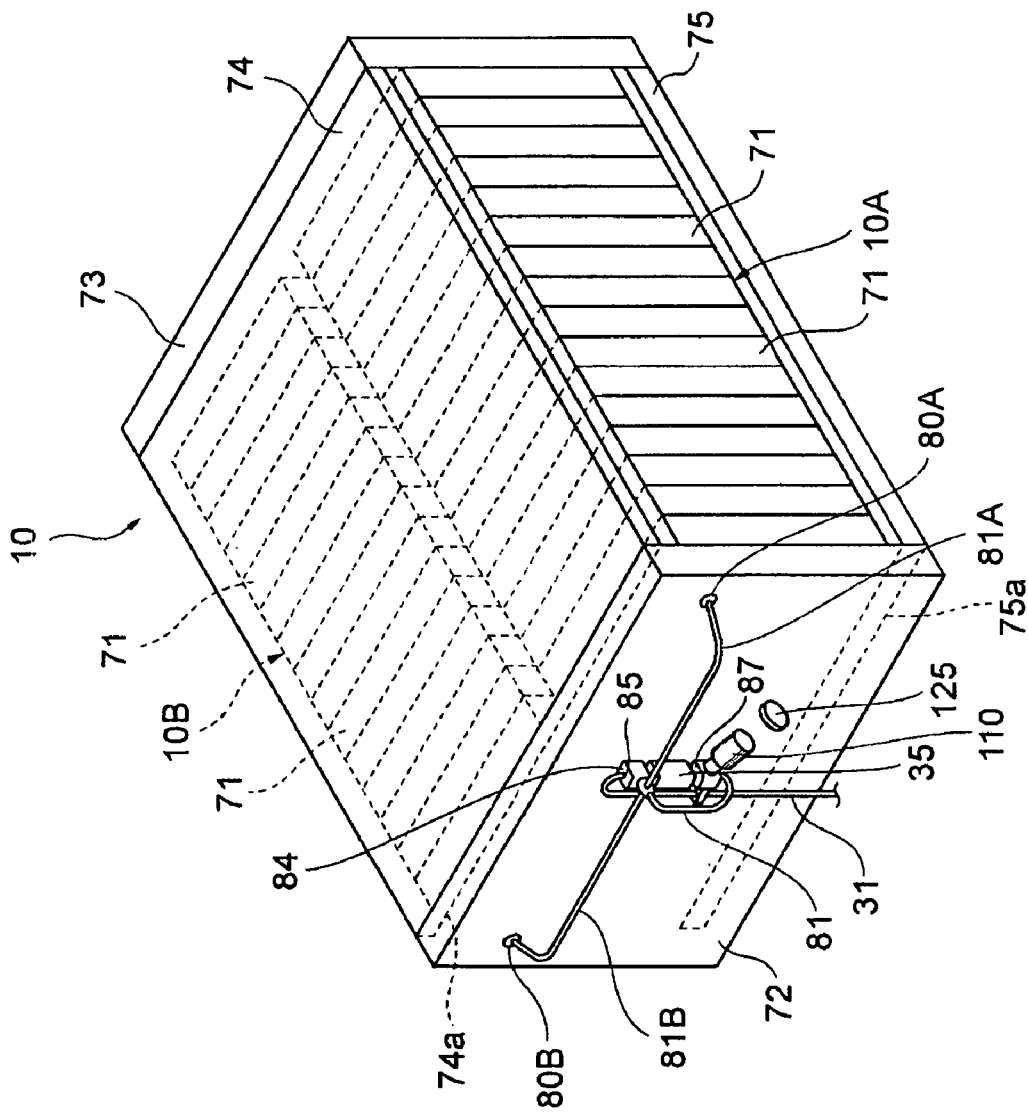
FIG. 4 is a perspective view showing a fuel cell of the fuel cell system shown in FIG. 1.

As shown in FIG. 4, in the fuel cell 10, a pair of fuel cell stacks 10A, 10B each having a constitution in which the required number of rectangular unitary cells 71 for receiving the supplied reactant gas to generate the power are stacked are arranged while the laminated directions of the unitary cells 71 are parallel to each other, and the stacks are sandwiched between a pair of common end plates 72 and 73 arranged at both ends of the cell in the laminated direction.

Figure 5:
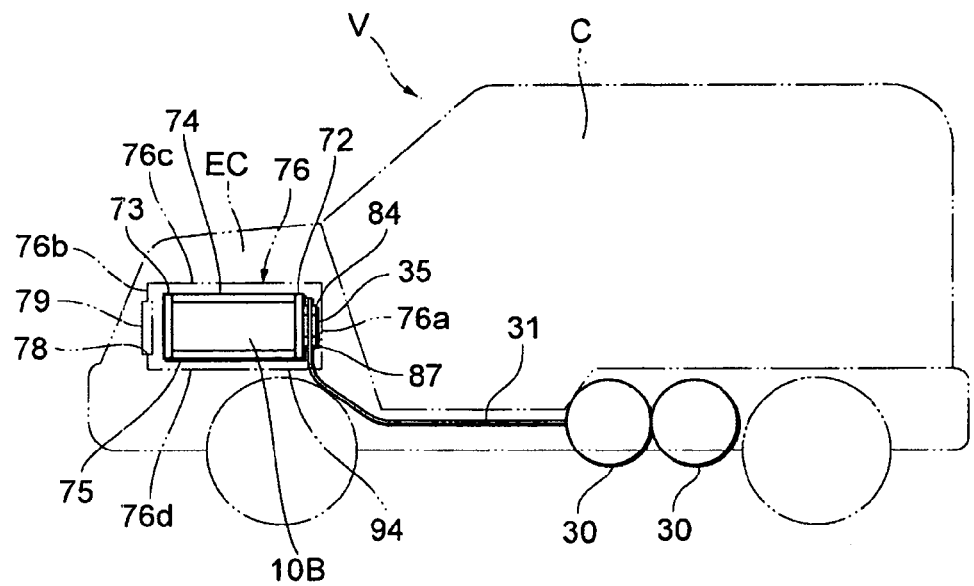
FIG. 5 is a side view schematically showing a car on which the fuel cell system shown in FIG. 1 is mounted.

It is to be noted that these end plates 72, 73 are connected to each other via a pair of tension plates 74, 75 arranged on both sides in a direction crossing the arrangement direction of the fuel cell stacks 10A, 10B at right angles. As shown in FIG. 5, this fuel cell 10 is received in a substantially rectangular parallelepiped stack case 76 and mounted in a car V.

In this mounted state, the fuel cell 10 having such a posture that the fuel cell stacks 10A, 10B are arranged in a horizontal direction is installed in an engine compartment EC provided on the front side of the car V. At this time, the pair of end plates 72, 73 are arranged at both ends in a car body front-to-rear direction, and the pair of tension plates 74, 75 are vertically arranged. Hereinafter, the fuel cell will be described with this posture during the installation.

The injector 35 is provided integrally on the one end plate 72 on the rear side of the fuel cell 10 in a vehicle front-to-rear direction. On the other hand, the face of the stack case 76 for receiving the fuel cell 10, that is, the face other than a rear face 76a facing the injector 35, the face being not disposed between the injector 35 and a passenger chamber C, specifically a front face 76b is provided with a ventilation hole 78 connecting the inside to the outside.

This ventilation hole 78 is provided with a filter 79 which allows the passing of vapor while regulating the passing of hydrogen. It is to be noted that the ventilation hole 78 may be provided in another face such as an upper face 76c, as long as the face is a face other than the face facing the injector 35, and the face is not disposed between the injector 35 and the passenger chamber C.

As shown in FIG. 4, the pair of end plates 72, 73 are disposed in common with the plurality of fuel cell stacks 10A, 10B, and hence have a substantially rectangular shape long in a car width direction, and the injector 35 is integrally provided in the center between the fuel cell stacks 10A and 10B of a plurality of rows (two rows in FIG. 4) arranged in the one end plate 72 on the rear side in the vehicle front-to-rear direction.

Here, the fuel cell stacks 10A, 10B have mutually opposite polarities on the end plate 72 side, and hence hydrogen supply ports 80A, 80B for supplying the hydrogen gases to the respective stacks in the shortest distance are arranged symmetrically in the length direction of the end plate 72. In consequence, since the injector 35 is arranged as described above, the lengths of pipe portions 81A, 81B branching from a pipe 81 extending from the injector 35 in the hydrogen supply passage 31 and connected to the respective hydrogen supply ports 80A, 80B can be set to an equal length.

Figure 6:
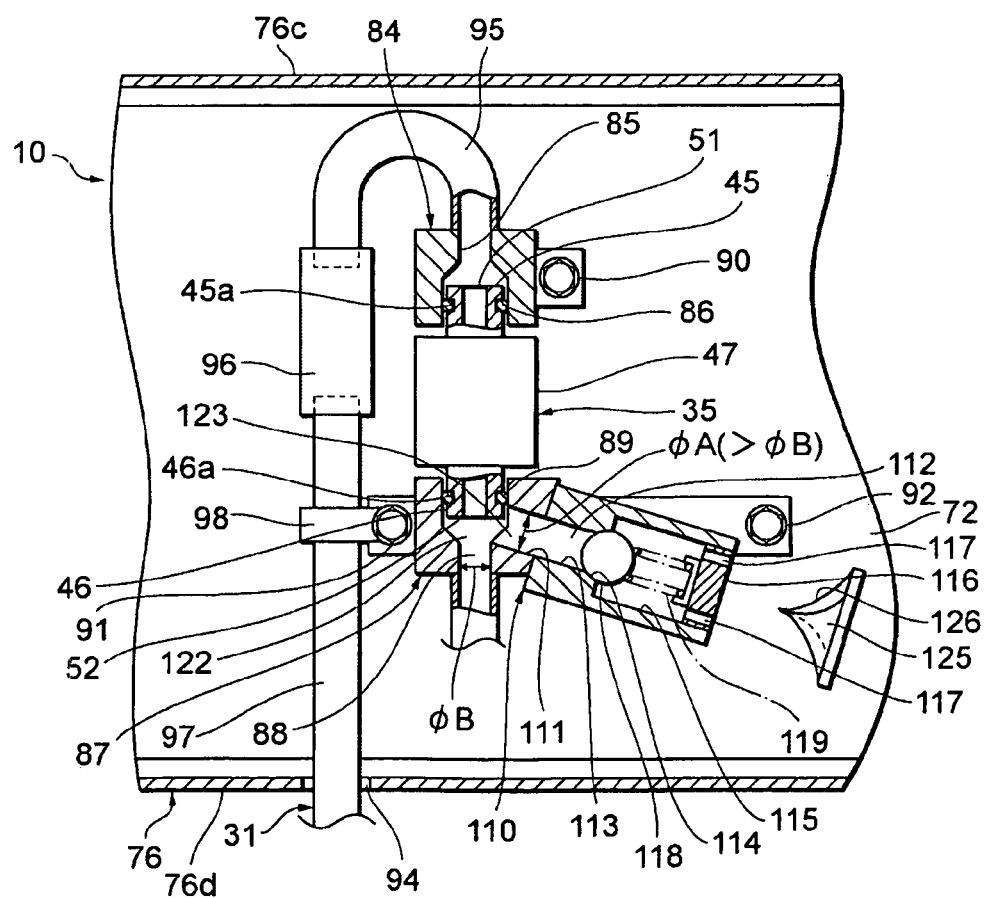
FIG. 6 is an partially enlarged front view showing a section of a part of the fuel cell of the fuel cell system shown in FIG. 1.

More specifically, as shown in FIG. 6, the cylindrical portion 45 of the injector 35 on an inlet side is fitted into a hole portion 85 of a support block 84 made of a metal via an O-ring 86 as an elastic member arranged in the seal groove 45a, and the cylindrical portion 46 on an outlet side is fitted into a hole portion 88 of a support block 87 made of a metal via an O-ring 89 as an elastic member arranged in the seal groove 46a.

Moreover, the one support block 84 arranged on the upside is fixed to the end plate 72 by a bolt in one fastening portion 90, and the other support block 87 arranged on the downside is fixed to the end plate 72 by bolts in two fastening portions 91, 92 on both sides. The two fastening portions 91, 92 connecting this support block 87 to the end plate 72 are connected to each other along a horizontal line.

As described above, the injector 35 is provided in the end plate 72 while the axial direction of the injector, that is, a valve body driving direction (the moving direction of the valve body 65) is a vertical direction, and both sides of the injector is supported by the support blocks 84, 87 via the O-rings 86, 89 as the elastic members. In consequence, the cylindrical portion 45 on the upstream side of the injector 35 and the cylindrical portion 46 on the downstream side are connected to the fuel cell 10 via the pair of support blocks 84, 87, and these cylindrical portions 45, 46 are warmed by heat generated by the fuel cell 10. Moreover, the port portion 51 of the injector 35 as a gas inlet is arranged above the port portion 52 as a gas outlet in the vertical direction.

Furthermore, the support blocks 84, 87 are connected to the end plate 72 of the fuel cell 10 by the three fastening portions 90, 91 and 92 as a whole, and the two fastening portions 91, 92 for connecting the lower support block 87 to the end plate 72 are arranged in parallel with the extending direction of connecting portions 74a, 75a of the tension plates 74, 75 with respect to the end plate 72 shown in FIG. 4.

It is to be noted that the support blocks 84, 87 may be connected to the end plate 72 at not three points but four points as a whole. However, with two points or less, the injector 35 cannot stably be supported. With five or more points, the number of the support points is excessively large, and hence there is a high possibility that the fastening portions loosen owing to the deformation of the end plate 72 or the like, and either case is unfavorable.

Here, as shown in FIG. 5, the hydrogen supply passage 31 extending from the hydrogen tanks 30 provided in the rear part of the car V passes under a floor of the passenger chamber C of the car V, is guided into the engine compartment EC, and is introduced into the stack case 76 through a hole portion 94 formed in a lower face 76d of the stack case 76. Furthermore, as shown in FIG. 6, the hydrogen supply passage passes by the side of the injector 35, and is connected to the upper support block 84. Thus, the hydrogen supply passage 31 connected to the support block 84 communicates with the hole portion 85, and communicates with the port portion 51 of the injector 35 through this hole portion 85.

It is to be noted that the hydrogen supply passage 31 on the side connected to the support block 84 is divided into a metal pipe portion 95 connected to the support block 84 and having a U-shape, an insulating pipe portion 96 constituted of an elastic member connected to this pipe portion 95, and a metal pipe portion (an inlet side pipe) 97 connected to this insulating pipe portion 96. Moreover, the insulating pipe portion 96 electrically insulates the hydrogen supply passage 31 which connects the fuel cell 10 having a high potential to an earthed body of each hydrogen tank 30, and this insulating pipe portion 96 is arranged in the stack case 76.

Moreover, the middle portion of the pipe portion 97 inserted through hole portion 94 of the lower face 76d of the stack case 76 is fixed to a bracket 98 fastened together to the fastening portion 91 which fixes the support block 87 to the end plate 72. This stabilizes the posture of the pipe portion 97, because the posture of the insulating pipe portion 96 as the elastic member is not stabilized as it is.

Furthermore, in the first embodiment, an open valve 110 as a gas element component responding to the physical quantity of the hydrogen gas circulating through the hydrogen supply passage 31 is integrally provided in the injector 35.

That is, as shown in FIG. 6, the support block 87 which supports the cylindrical portion 46 on the downstream side of the injector 35 is provided with a communication hole 111 extending downwards to the front side from the middle position of the hole portion 88 disposed inside the block in the vertical direction, an internal passage 112 is arranged in a portion extending from the communication hole 111, and the open valve 110 is attached to the internal passage.

The internal passage 112 of the open valve 110 is constituted of hole portions arranged in order from the communication hole 111, that is, a small-diameter hole portion 113, a tapered hole portion 114 having a large diameter away from the small-diameter hole portion 113 and a large-diameter hole portion 115 having a diameter larger than that of the small-diameter hole portion 113, and a lid member 116 is fitted into the large-diameter hole portion 115 on a side opposite to the small-diameter hole portion 113.

This lid member 116 is provided with a plurality of open ports 117 which open the internal passage 112 outwardly from the hydrogen supply passage 31, a spherical valve body 118 is arranged on the side of the tapered hole portion 114 between the lid member 116 and the tapered hole portion 114, and a spring 119 is arranged between the valve body 118 and the lid member 116.

Since the hole portion 88 and the communication hole 111 are provided, the support block 87 is provided with a main passage portion 122 formed in the hole portion 88 extending along the vertical direction, and a branch passage portion 123 branching from the main passage portion 122 formed in the communication hole 111 to the open valve 110, and the branch passage portion 123 extending slightly downwards to the front side in a direction substantially crossing the main passage portion 122 at right angles. Moreover, the main passage portion 122 extends below the branch position of the branch passage portion 123.

Furthermore, the open ports 117 of the lid member 116 extend downwards to the front side along the communication hole 111, and are directed below a horizontal direction. In addition, a diameter $\phi A$ of the communication hole 111 is larger than a minimum diameter $\phi B$ of the hole portion 88. That is, the passage sectional area of the communication hole 111 is larger than that of the main passage portion 122 in the hole portion 88.

Thus, in the open valve 110, when the pressure of the hydrogen supply passage 31 is a predetermined pressure or less and smaller than the urging force of the spring 119, the valve body 118 abuts on the tapered hole portion 114 by the urging force of the spring 119, and does not open the hydrogen supply passage 31. When the pressure of the hydrogen supply passage 31 is larger than the predetermined pressure, the valve body 118 detaches from the tapered hole portion 114 against the urging force of the spring 119 to connect the hydrogen supply passage 31 to the outside air.

Figure 7:
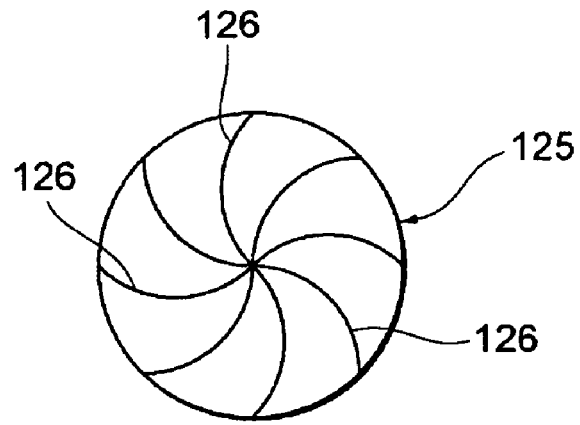
FIG. 7 is a front view showing a diffusion plate for use in the fuel cell system shown in FIG. 1.
Figure 8:
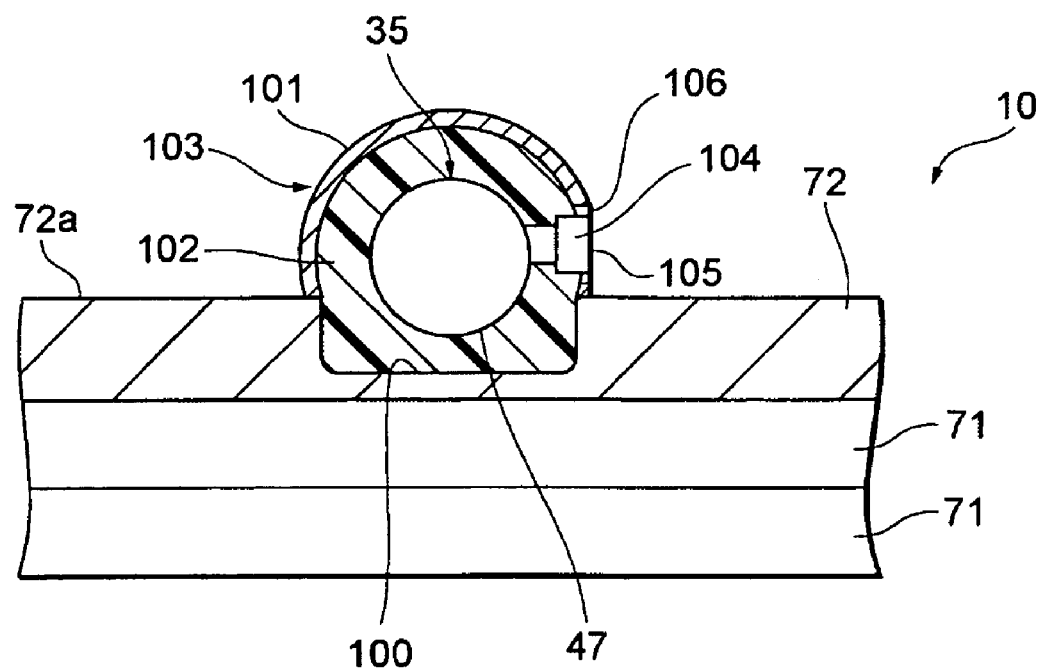
FIG. 8 is a sectional view of a modification showing a section around the injector of the fuel cell system shown in FIG. 1.

A portion to which the gas is jetted from the open ports 117 of the open valve 110 is provided with a diffusion plate 125 which decelerates and diffuses the gas jetted from the open ports 117. This diffusion plate 125 is fixed to the end plate 72, the height of the center of the plate forms a peak of a mountain-like shape, and the plate is provided with a plurality of blade portions 126 curved in the same direction radially from the center as shown in FIG. 7.

According to the fuel cell system 1 of the first embodiment described above, since the open valve 110 as the gas element component responding to the physical quantity of the reactant gas circulating through the hydrogen supply passage 31 is integrally provided in the injector 35 to come close to the injector, the response delay of the open valve 110 with respect to pressure fluctuations caused by the injector 35 can be suppressed. Therefore, when the hydrogen gas pressure regulated by the injector 35 on the upstream side of the open valve 110 in the hydrogen supply passage 31 is the predetermined pressure, the open valve 110 can quickly respond, that is, open to release the pressure of the hydrogen supply passage 31 to the outside air, and it is possible to suppress a defect occurring in a case where this pressure exceeds the predetermined pressure.

Moreover, the open valve 110 is provided in the support block 87 for supporting the downstream side of the injector 35 so that the open ports 117 are directed below the horizontal direction. Therefore, even when droplets attach to the open valve 110 on the side of the open ports 117, the droplets fall down owing to their own weights, and the attaching of the droplets to the valve body 118 is suppressed.

Additionally, in the open valve 110, the support block 87 for supporting the downstream side of the injector 35 is provided with the main passage portion 122 and the branch passage portion 123 branching from the main passage portion 122 to the open valve 110, and the main passage portion 122 extends below the branch position of the branch passage portion 123. Therefore, even when the humid hydrogen off gas from the fuel cell 10 is introduced into the circulation passage 32 provided on the downstream side of the main passage portion 122, dew condensation water generated by the vapor of the gas can be prevented from entering the open valve 110. Therefore, freezing/securing caused in the open valve 110 can be suppressed.

Furthermore, the diffusion plate 125 is provided at the portion to which the gas is jetted from the open ports 117 of the open valve 110. Therefore, when the open valve 110 is opened, the hydrogen gas is decelerated and diffused by the diffusion plate 125. Therefore, the breakdown of the other parts due to the high jet flow rate of the hydrogen gas and the like can be suppressed.

In addition, the passage sectional area of the branch passage portion 123 branching from the main passage portion 122 to the open valve 110 is larger than that of the main passage portion 122 provided in the support block 87. Therefore, when the hydrogen gas flows from the injector 35 with a high flow rate owing to the adhering of the injector 35 to the opened state thereof, more gas can be allowed to flow through the open valve 110, and discharged outwardly from the hydrogen supply passage 31, and the pressure applied to the fuel cell 10 can be decreased.

Moreover, since the branch passage portion 123 extends along the direction substantially crossing the main passage portion 122 at right angles, the open valve 110 connected to the branch passage portion 123 does not easily receive the dynamic pressure of the hydrogen gas during the opening/closing of the injector 35, and eventually the opened valve pressure of the open valve 110 can further be lowered. Therefore, the deterioration of a part having a low withstand pressure, for example, the fuel cell 10 or the like can be suppressed. Alternatively, the withstand pressure of the fuel cell 10 can be lowered to lighten the fuel cell.

It is to be noted that in the fuel cell system 1 according to the first embodiment described above, as shown in FIG. 8, the end plate 72 in which the injector 35 is arranged is provided with a recessed portion 100 into which a part of the main body portion 47 of the injector 35 fits, a curved plate-like hard sound insulator 101 is arranged to cover the injector 35, and a gap between the recessed portion 100 and the sound insulator 101 and the injector 35 may be filled with a soft elastic material (a soft layer) 102.

In consequence, the elastic material 102 is provided between the injector 35 and the fuel cell 10, and a part of the injector 35 is embedded in the fuel cell 10. It is to be noted that the sound insulator 101 and the elastic material 102 constitute a sound absorbing cover 103 which covers the injector 35.

Moreover, a signal line connecting connector 104 for control signal communication provided in the injector 35 is arranged in parallel with an arrangement face 72a for the injector 35 in the end plate 72, so that a port portion 105 as a connecting portion between the signal line connecting connector 104 and a signal line may be disposed in parallel with the arrangement face 72a. Therefore, in the sound insulator 101, an opening 106 for exposing the signal line connecting connector 104 to the outside maybe formed on the side of the end plate 72.

Furthermore, the sound absorbing cover 103 constituted of the sound insulator 101 and the elastic material 102 may be provided to cover the open valve 110 together with the injector 35, and in this constitution, a gas jet sound during the opening of the open valve 110 can be suppressed.

Next, differences of a fuel cell system 1 according to a second embodiment of the present invention from the first embodiment will mainly be described.

Figure 9:
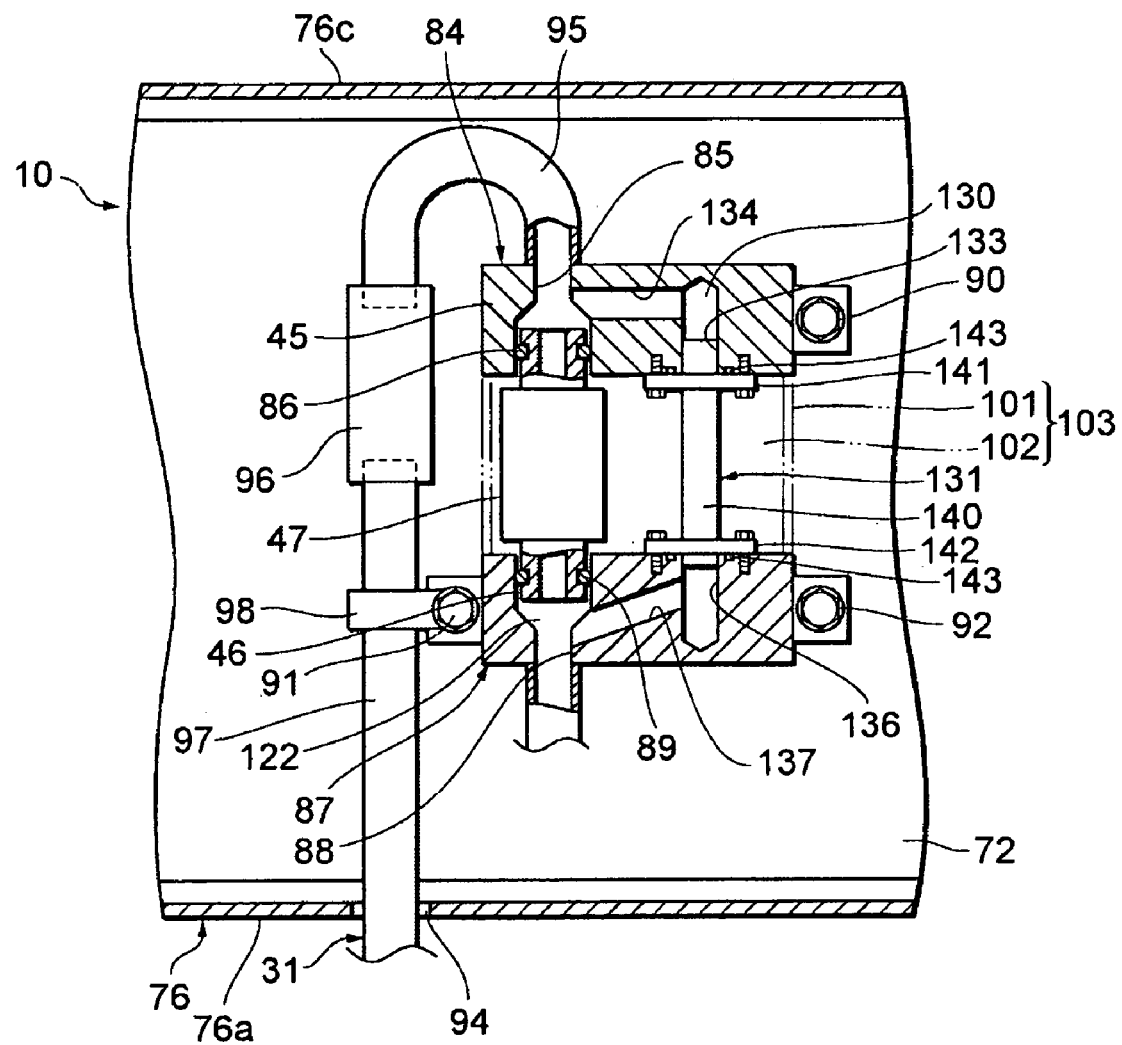
FIG. 9 is a partially enlarged front view showing a section of a part of a fuel cell of a fuel cell system according to a second embodiment of the present invention.

In the fuel cell system 1 according to the second embodiment, as shown in FIG. 9, the open valve of the first embodiment is not provided, a hydrogen supply passage 31 has a bypass passage 130 which bypasses an injector 35, this bypass passage 130 is provided with an open valve 131 as a gas element component responding to the physical quantity of a reactant gas circulating through the hydrogen supply passage 31, and this open valve 131 is integrally provided in the injector 35.

This open valve 35 is a relief valve which opens at a predetermined pressure and which, during the opening, connects the upstream side of the injector 35 to the downstream side without interposing the injector 35. Moreover, in the second embodiment, the open valve 131 is supported by a support block 84 which supports a cylindrical portion 45 on the upstream side of the injector 35 and a support block 87 which supports a cylindrical portion 46 on the downstream side, and the open valve connects these support blocks 84, 87 to each other.

That is, the upper support block 84 of the second embodiment is formed with a width larger than that of the first embodiment, along an end plate 72, additionally a fitting hole 133 is formed in parallel with a hole portion 85 for supporting the cylindrical portion 45, and the fitting hole 133 is connected to the hole portion 85 via a communication hole 134 crossing the fitting hole and the hole portion at right angles.

Moreover, the lower support block 87 is also formed with a width larger than that of the first embodiment, along the end plate 72, additionally a fitting hole 136 is formed in parallel with a hole portion 88 for supporting the cylindrical portion 46, and the fitting hole 136 is connected to the hole portion 88 via a communication hole 137 crossing the fitting hole and the hole portion at right angles. This communication hole 137 tilts downwards to the hole portion 88.

Furthermore, the open valve 131 is provided with flange portions 141, 142 at both ends of a case 140 of the open valve. While the end of the open valve from the one flange portion 141 is fitted into the fitting hole 133 of the support block 84, the open valve is fixed to the support block 84 by bolts in the flange portion 141. While the end of the open valve from the other flange portion 142 is fitted into the fitting hole 136 of the support block 87, the open valve is fixed to the support block 87 by bolts in the flange portion 142. It is to be noted that O-rings 143 for sealing gaps are interposed on the abutment faces of the support blocks 84, 87 to the flange portions 141, 142.

In addition, between the support blocks 84 and 87 described above, a sound insulator 101 is provided to cover both the injector 35 and the open valve 131. This sound insulator 101 is attached to the end plate 72, and a portion between this sound insulator 101 and the end plate is filled with an elastic material 102. That is, the injector 35 and the open valve 131 are covered with a sound absorbing cover 103 constituted of the sound insulator 101 and the elastic material 102.

As described above, according to the fuel cell system 1 of the second embodiment, since the open valve 131 as a gas element component responding to the physical quantity of a reactant gas circulating through the hydrogen supply passage 31 is integrally provided in the injector 35 to come close to this injector, the response delay of the open valve 131 with respect to pressure fluctuations caused by the injector 35 can be suppressed.

Therefore, when a hydrogen gas pressure on the upstream side from the injector 35 is a predetermined pressure owing to the injector 35, the open valve 131 can quickly respond, that is, open to release the hydrogen gas to the downstream side of the injector 35 in the hydrogen supply passage 31, and it is possible to suppress a defect occurring in a case where this pressure exceeds the predetermined pressure.

Moreover, since the open valve 131 is supported by the support block 84 for supporting the upstream side of the injector 35 and the support block 87 for supporting the downstream side, a support mechanism of the open valve 131 can be integrated, and constituent components can be simplified.

Furthermore, since the open valve 131 connects the support block 84 for supporting the upstream side of the injector 35 to the support block 87 for supporting the downstream side, the open valve 131 also serves as a connection mechanism of the support blocks 84, 87 on both sides, and the constituent components can be simplified.

Moreover, the open valve 131 is arranged inside the sound absorbing cover 103 constituted of the sound insulator 101 and the elastic material 102 which cover the injector 35, so that a temperature difference between the open valve and the injector 35 is not easily made, dew condensation does not easily occur, and taint damage is suppressed.

It is to be noted that instead of providing the flange portions 141, 142 in the open valve 131, an external thread is formed on the outer peripheral surface of the open valve 131, whereas the support blocks 84, 87 are provided with internal threads, and these threads may be screwed to each other. In this case, a collar into which the open valve 131 is inserted may be provided between the support blocks 84 and 87, and this collar may be held between the support blocks 84 and 87 to generate a fastening force by the open valve 131.

Next, differences of a fuel cell system 1 according to a third embodiment of the present invention from the first embodiment will mainly be described.

Figure 10:
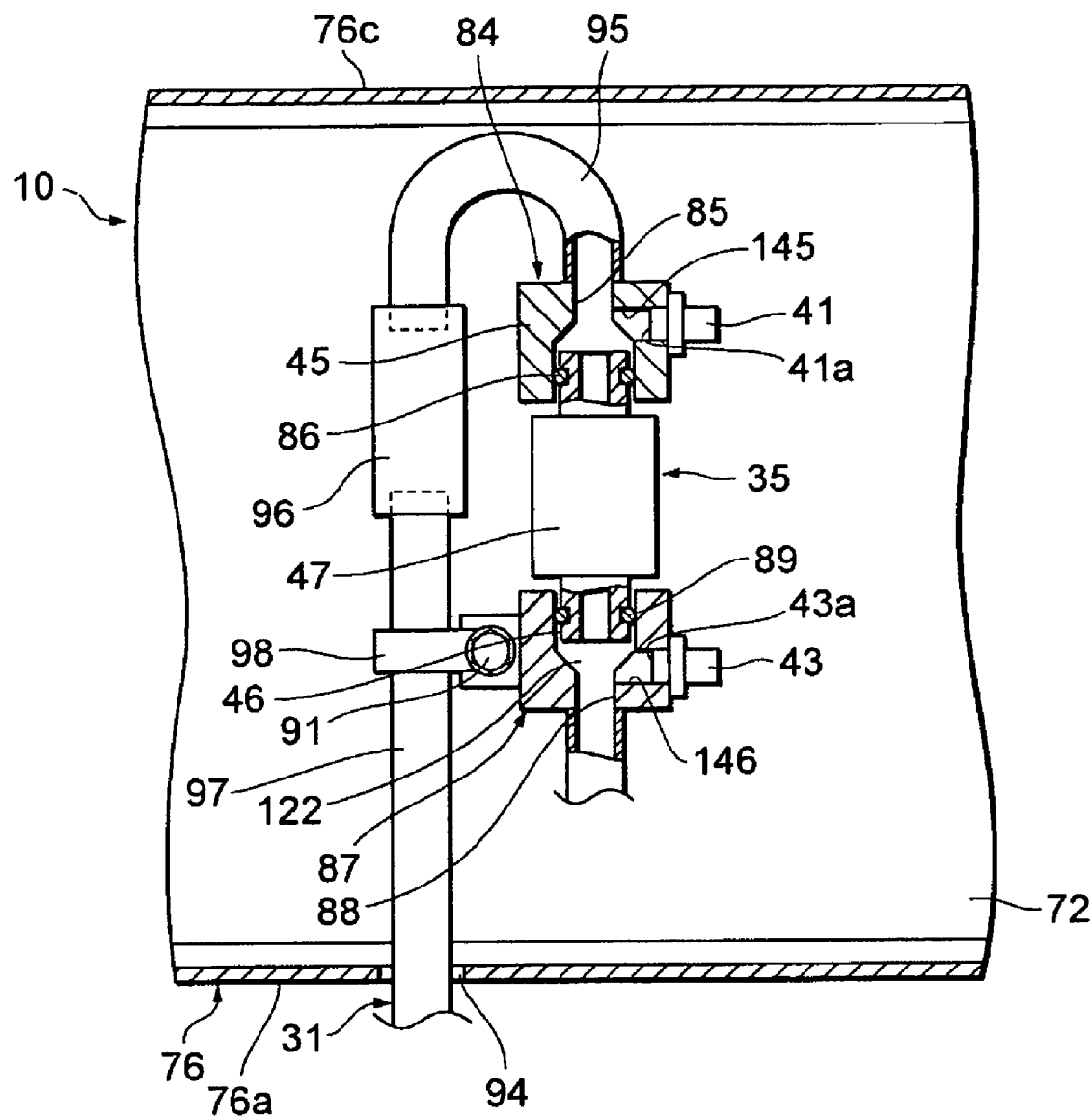
FIG. 10 is a partially enlarged front view showing a section of a part of a fuel cell of a fuel cell system according to a third embodiment of the present invention.

In the third embodiment, the open valve of the first embodiment is not provided. As shown in FIG. 10, as gas element components responding to the physical quantity of a reactant gas circulating through a hydrogen supply passage 31, for use in the opening/closing control of an injector 35, a primary pressure sensor 41 which determines a feed forward term of the opening/closing control and a secondary pressure sensor 43 which determines a feedback term are integrally provided in the injector 35. Needless to say, the third embodiment may be provided with the open valve of the first embodiment or the second embodiment.

A support block 84 which supports a cylindrical portion 45 on the upstream side of the injector 35 is provided with a screw hole 145 parallel to an end plate 72 in a direction (a direction crossing at right angles) intersecting with a hole portion 85 extending along a vertical direction in the support block, and the pressure sensor 41 is screwed into this screw hole 145 from the outside.

Here, this screw hole 145 communicates with a space constituting a part of the hydrogen supply passage 31 defined by an O-ring 86 of the hole portion 85 and the injector 35, and a detecting portion 41a at the tip of the primary pressure sensor 41 detects a pressure right on the upstream side of the injector 35 in the hydrogen supply passage 31 through the screw hole 145.

Moreover, a support block 87 which supports a cylindrical portion 46 on the downstream side of the injector 35 is provided with a screw hole 146 parallel to the end plate 72 in a direction (a direction crossing at right angles) intersecting with a hole portion 88 extending along a vertical direction in the support block, and the pressure sensor 43 is screwed into this screw hole 146 from the outside.

Here, this screw hole 146 communicates with a space constituting a part of the hydrogen supply passage 31 defined by an O-ring 89 of the hole portion 88 and the injector 35, and a detecting portion 43a at the tip of the pressure sensor 43 detects a pressure right on the downstream side of the injector 35 in the hydrogen supply passage 31 through the screw hole 146.

According to the fuel cell system 1 of the third embodiment described above, since the pressure sensors 41, 43 as the gas element components responding to the physical quantity of the reactant gas circulating through the hydrogen supply passage 31 are integrally provided in the injector 35 to come close to the injector, the response delay of the pressure sensors 41, 43 with respect to pressure fluctuations caused by the injector 35, that is, the time delay of the pressure detection by the primary pressure sensor 41 and the secondary pressure sensor 43 can be suppressed.

In consequence, as described above, the control delay of the injector 35 controlled based on the pressure value detected by the primary pressure sensor 41, the pressure value detected by the secondary pressure sensor 43 and the like can be suppressed.

The invention claimed is:

1. A fuel cell system comprising:
a fuel cell;
a reactant gas pipe which supplies a reactant gas to the fuel cell;
an injector for regulating a gas flow rate and a pressure of the reactant gas on an upstream side of the injector in the reactant gas pipe to supply the gas to the downstream side of the injector,
wherein the injector includes an internal passage, a valve seat and a valve body movably inserted into said internal passage, and regulates the gas flow rate and the pressure of the reactant gas by driving said valve body at a predetermined drive cycle by an electromagnetic driving force to separate the valve body from said valve seat,
the fuel cell system further comprising:
a support block which supports the injector; and a gas element component responsive to the physical quantity of the reactant gas circulating through the reactant gas pipe, said gas element component being provided at the support block.

2. The fuel cell system according to claim 1, wherein the gas element component is an opening valve which opens at a predetermined pressure.

3. The fuel cell system according to claim 2, wherein the opening valve connects the downstream side of the injector to the outside of the reactant gas pipe, when opening.

4. The fuel cell system according to claim 2, wherein the opening valve connects the upstream side of the injector to the downstream side thereof, when opening.

5. In the fuel cell system according to claim 3, wherein the opening valve is provided at the support block which supports the downstream side of the injector, and
open ports of the opening valve to the outside of the reactant gas pipe are directed downwards.

6. The fuel cell system according to claim 5, wherein a diffusion plate is provided at a portion to which the gas is jetted from the open ports.

7. The fuel cell system according to claim 3, wherein the opening valve is provided at the support block which supports the downstream side of the injector,
a main passage portion and a branch passage portion branching from the main passage portion to the opening valve are provided at the support block, and
the main passage portion extends below the branch position of the branch passage portion.

8. The fuel cell system according to claim 3, wherein the opening valve is provided at the support block which supports the downstream side of the injector,
a main passage portion and a branch passage portion branching from the main passage portion to the opening valve are provided at the support block, and
the passage sectional area of the branch passage portion is larger than that of the main passage portion.

9. The fuel cell system according to claim 3, wherein the opening valve is provided at the support block which supports the downstream side of the injector,
a main passage portion and a branch passage portion branching from the main passage portion to the open valve are provided at the support block, and
the branch passage portion extends along a direction crossing the main passage portion at right angles.

10. The fuel cell system according to claim 4, wherein the opening valve is supported by the support block which supports the upstream side of the injector and which supports the downstream side of the injector.

11. The fuel cell system according to claim 2, wherein the opening valve is arranged on the inner side of a sound absorbing cover which covers the injector.

12. The fuel cell system according to claim 1, wherein the gas element component is a pressure sensor for use in the opening/closing control of the injector.

* * * * *